United States Patent
Saito (10) Patent No.: US 10,162,577 B2
(45) Date of Patent: Dec. 25, 2018

(54) IMAGE PROCESSING APPARATUS AND METHOD AND NON-TRANSITORY COMPUTER READABLE MEDIUM

(71) Applicant: FUJI XEROX Co., Ltd., Tokyo (JP)

(72) Inventor: Kazutaka Saito, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/651,657

(22) Filed: Jul. 17, 2017

(65) Prior Publication Data

US 2017/0315762 A1 Nov. 2, 2017

Related U.S. Application Data

(63) Continuation of application No. 14/696,546, filed on Apr. 27, 2015.

(30) Foreign Application Priority Data

Dec. 22, 2014 (JP) .................................. 2014-258444

(51) Int. Cl.
*G06F 3/12* (2006.01)
(52) U.S. Cl.
CPC .......... *G06F 3/1222* (2013.01); *G06F 3/1209* (2013.01); *G06F 3/1236* (2013.01); *G06F 3/1239* (2013.01); *G06F 3/1285* (2013.01)
(58) Field of Classification Search
CPC .... G06F 3/1222; G06F 3/1285; G06F 3/1236; G06F 3/1239; G06F 3/1209
See application file for complete search history.

(56) References Cited

U.S. PATENT DOCUMENTS

| | | |
|---|---|---|
| 2004/0073689 A1 | 4/2004 | Aoki et al. |
| 2004/0075863 A1 | 4/2004 | Suzuki et al. |
| 2006/0195596 A1 | 8/2006 | Kawai |
| 2010/0235883 A1* | 9/2010 | Sato .................. H04N 1/00408 726/3 |
| 2011/0063670 A1 | 3/2011 | Ito |
| 2013/0141753 A1 | 6/2013 | Kamoi |

FOREIGN PATENT DOCUMENTS

| | | |
|---|---|---|
| JP | 2009137299 A | 6/2009 |
| JP | 2010219757 A | 9/2010 |
| JP | 2011-066714 A | 3/2011 |

OTHER PUBLICATIONS

Communication dated Jul. 3, 2018, from Japanese Patent Office in counterpart application No. 2014-258444.
Communication dated Sep. 18, 2018 from the Japanese Patent Office in counterpart application No. 2014-258444.

* cited by examiner

*Primary Examiner* — Kent Yip
(74) *Attorney, Agent, or Firm* — Sughrue Mion, PLLC (57) ABSTRACT

An image processing apparatus includes plural communication interfaces, a request receiving unit, and a restricting unit. The request receiving unit receives, by using a communication interface, a request for system information including management information concerning the image processing apparatus from a communication device. The restricting unit restricts at least part of the system information to be sent to the communication device if an IP address assigned to the communication interface used for receiving the request is a global IP address.

11 Claims, 10 Drawing Sheets

| PROCESSING TO BE RESTRICTED | ADMINISTRATOR AUTHENTICATING DATA IS NOT SET | SNMP AUTHENTICATING DATA IS NOT SET | SETTING OF IP ADDRESS FILTERING IS DISABLED |
|---|---|---|---|
| DISPLAY OF WEB SCREEN | DON'T CARE | DON'T CARE | RESTRICTED |
| SETTING OF SYSTEM INFORMATION (EXCEPT FOR MIB MANAGEMENT INFORMATION) | RESTRICTED | DON'T CARE | RESTRICTED |
| OBTAINING OF MIB MANAGEMENT INFORMATION | DON'T CARE | RESTRICTED | RESTRICTED |
| SETTING OF MIB MANAGEMENT INFORMATION | RESTRICTED | RESTRICTED | RESTRICTED |
| SETTING OF TRAP NOTIFY DESTINATION | RESTRICTED | RESTRICTED | RESTRICTED |
| EXTRACTING OF USER DATA FROM CONFIDENTIAL BOX | DON'T CARE | DON'T CARE | RESTRICTED |
| SENDING OF INFORMATION CONCERNING THE CONTENT OF PROCESSING DATA | DON'T CARE | DON'T CARE | RESTRICTED |
| | | | |
| | | | |

IMAGE PROCESSING APPARATUS AND METHOD AND NON-TRANSITORY COMPUTER READABLE MEDIUM

CROSS-REFERENCE TO RELATED APPLICATIONS

This is a Divisional Application. Domestic priority is claimed from U.S. patent application Ser. No. 14/696,546 filed Apr. 27, 2015. Priority has been claimed under the International Convention from Japan Patent Application No. 2014-258444 filed Dec. 22, 2014, the contents of all of which are incorporated herein by reference.

BACKGROUND (i) Technical Field

The present invention relates to an image processing apparatus and method and a non-transitory computer readable medium.

(ii) Related Art

These days, it is possible to physically or virtually provide plural communication interfaces to an image processing apparatus, such as a printer or a scanner, and to connect these communication interfaces to different communication networks.

In an image processing apparatus, such as a multifunction device, including plural communication interfaces, it is sometimes desired that the communication interfaces be connected to communication networks to which different ranges of users are allowed to access. For example, the following case may be considered. In a public place, such as a school or a public office, one communication interface of an image processing apparatus is connected to an intranet used by specific users, such as members of a public institution, while another communication interface is connected to a global internet protocol (IP) network that general users can access, thereby allowing general users to utilize the image processing apparatus.

SUMMARY

According to an aspect of the invention, there is provided an image processing apparatus including plural communication interfaces, a request receiving unit, and a restricting unit. The request receiving unit receives, by using a communication interface, a request for system information including management information concerning the image processing apparatus from a communication device. The restricting unit restricts at least part of the system information to be sent to the communication device if an IP address assigned to the communication interface used for receiving the request is a global IP address.

BRIEF DESCRIPTION OF THE DRAWINGS

An exemplary embodiment of the present invention will be described in detail based on the following figures, wherein.

DETAILED DESCRIPTION

An example of a mode for carrying out the present invention (hereinafter referred to as an "exemplary embodiment") will be described below with reference to the drawings. In the drawings accompanying the specification, similar elements are designated by like reference numerals, and a detailed explanation thereof may be given only once.

[1. System Configuration]

Figure 1:
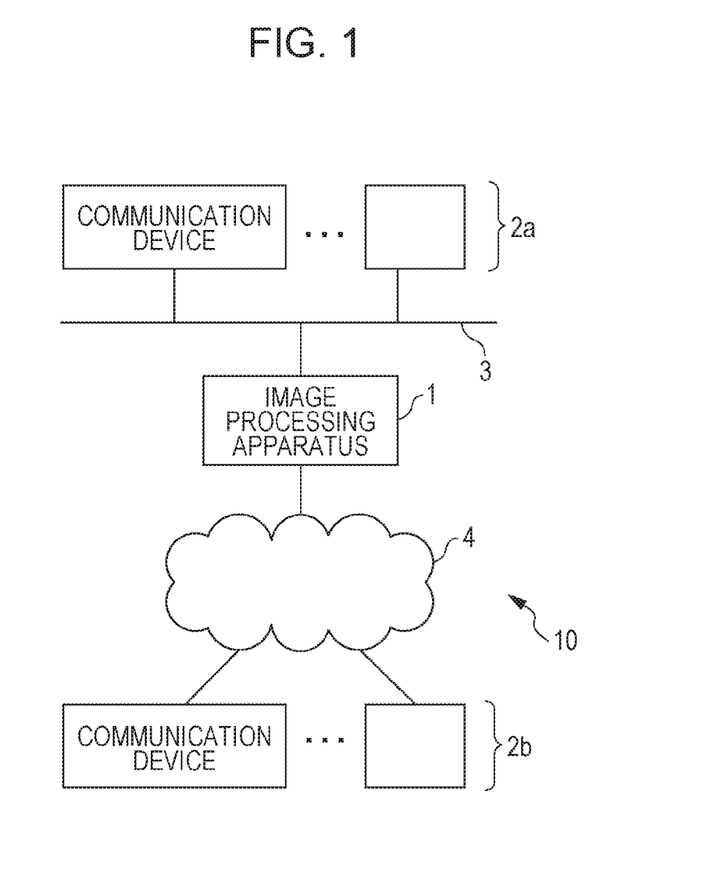
FIG. 1 illustrates an example of the device configuration of an image processing system.

FIG. 1 illustrates an example of the device configuration of an image processing system 10 according to an exemplary embodiment of the present invention. As shown in FIG. 1, the image processing system 10 includes an image processing apparatus 1 and at least one communication device 2a and at least one communication device 2b (hereinafter may be simply referred to as a "communication device 2" or "communication devices 2"). The image processing apparatus 1 and the communication device 2a are connected to each other via a network used by specific users, such as an intranet or a local area network (LAN) (hereinafter may also be referred to as a "private IP network 3"), and are able to send and receive data to and from each other. The image processing apparatus 1 and the communication device 2b are connected to each other via a network used by general users, such as the Internet (hereinafter may also be referred to as a "global IP network 4"), and are able to send and receive data to and from each other.

The image processing apparatus 1 is a so-called multifunction device including, for example, a print function and a scanner function. The image processing apparatus 1 includes a controller 11, such as a microprocessor, a storage unit 12, such as a random access memory (RAM) and a hard disk drive, and communication interfaces 13. The controller 11 controls the sending and the setting of system information stored in the storage unit 12 according to a program stored in the storage unit 12. This program may be stored in the image processing apparatus 1 through the use of an information storage medium, such as a flash memory, or via a communication network, such as the Internet.

The communication device 2 is, for example, a server, a personal computer, a cellular phone such as a smartphone, or a tablet terminal. The communication device 2 includes a controller 21, a storage unit 22, and a communication interface 23, as in the image processing apparatus 1, and also includes an input unit 24 such as a mouse and a keyboard or a touch panel, which receives input from a user, and a display unit 25 such as a display device.

In this exemplary embodiment, the communication device 2 sends a request to send or set system information stored in the image processing apparatus 1 to the image processing apparatus 1. Then, in response to this request, the image processing apparatus 1 executes processing for sending or setting system information stored in the image processing apparatus 1. However, in response to a request from a communication device 2 which is connected to the global IP network 4 and which does not satisfy security conditions, restrictions are imposed so that the image processing apparatus 1 will not execute such processing. Details of the functions of the image processing apparatus 1 will be discussed below.

[2. Functional Block]

Figure 2:
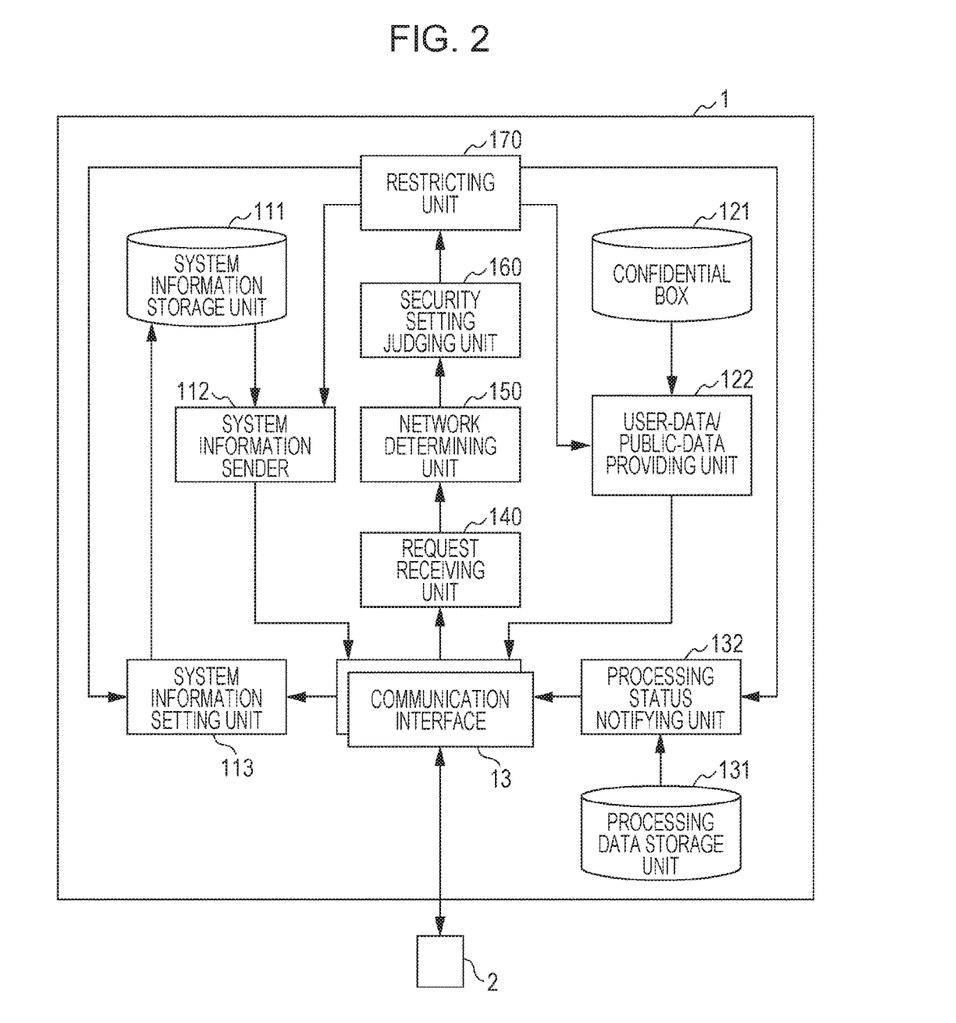
FIG. 2 is a functional block diagram illustrating an example of the functional configuration of an image processing apparatus.

FIG. 2 is a functional block diagram illustrating an example of the functional configuration of the image processing apparatus 1. As shown in FIG. 2, the image processing apparatus 1 includes, as its functions, a system information storage unit 111, a system information sender 112, a system information setting unit 113, a confidential box 121, a user-data/public-data providing unit 122, a processing data storage unit 131, a processing status notifying unit 132, a request receiving unit 140, a network determining unit 150, a security setting judging unit 160, and a restricting unit 170. These functions are implemented as a result of the controller 11 of the image processing apparatus 1 executing a program stored in the storage unit 12.

[2-1. System Information Storage Unit]

The system information storage unit 111 stores system information therein. The system information indicates at least one of the machine type name and the serial number of the image processing apparatus 1, management information, communication history, history of jobs executed in the image processing apparatus 1, machine information including setting information concerning the image processing apparatus 1, and personal information (such as a personal address book) stored in the confidential box 121 of the image processing apparatus 1.

The management information is information which is disclosed for allowing an external source to understand the state of the image processing apparatus 1. The management information includes information concerning the operating state of the image processing apparatus 1 (for example, "printing in progress" or "paper out"), configuration information concerning the image processing apparatus 1 (for example, a finisher or tray configuration), and information indicating the status of a print job executed in the image processing apparatus 1 (for example, "successfully completed" or "processing in progress"). At least part of the management information is constituted by using a management information base (MIB), and is sent to the communication device 2 by using a simple network management protocol (SNMP). Hereinafter, management information constituted by using the MIB will also be referred to as "MIB management information".

The system information storage unit 111 also stores notify destination information indicating a communication device 2 which is notified of at least part of the system information by the image processing apparatus 1. The system information storage unit 111 may be implemented by including the storage unit 12 of the image processing apparatus 1.

[2-2. System Information Sender]

In response to a request for system information from a communication device 2, the system information sender 112 sends at least part of the system information stored in the system information storage unit 111 to this communication device 2. The system information sender 112 sends webpage data indicating at least part of the system information to the communication device 2. Then, a screen indicating this system information is displayed on the display unit 25 of the communication device 2.

If system information is sent through the use of webpage data in this manner, MIB management information is not included in this system information. In response to a SNMP protocol command (such as GetRequest) sent from a communication device 2, the system information sender 112 sends system information including the requested MIB management information, together with a command, such as GetResponse, to the communication device 2. However, if the sending of system information is restricted by the restricting unit 170, which will be discussed later, the system information sender 112 performs control so that at least part of the system information will not be sent to the communication device 2 that has requested for the system information.

If a predetermined event occurs in the image processing apparatus 1, the system information sender 112 sends at least part of the system information to a communication device 2 which has been set as a notify destination in advance. More specifically, if the occurrence of a predetermined event in the image processing apparatus 1 is detected (for example, if system information is updated, if an error occurs, or if the value of an internal variable (counter) exceeds a threshold), the system information sender 112 sends at least part of the system information which is determined in accordance with the event in advance to the communication device 2 indicated by the notify destination information. The system information sender 112 sends at least part of the system information (for example, MIB management information), together with a Trap command of the SNMP protocol, to the communication device 2. Hereinafter, the sending of at least part of system information in this manner will also be referred to as "TRAP notify", and a communication device 2 which receives this TRAP notify will also be referred to as a "TRAP notify destination".

[2-3. System Information Setting Unit]

The system information setting unit 113 sets at least part of the system information stored in the system information storage unit 111. The system information setting unit 113 sends webpage data indicating the system information to a communication device 2, and obtains input information input by a user on a setup screen displayed on the display unit 25 of the communication device 2 so as to set this input information as new system information.

If the SNMP protocol is used, the system information setting unit 113 sets information sent together with a command, such as SetRequest, from a communication device 2, as new system information.

In addition to the setting of system information, the system information setting unit 113 also sets a communication device 2, as a TRAP notify destination, in notify destination information stored in the system information storage unit 111. More specifically, the system information setting unit 113 sends webpage data including notify destination information, and then sets a communication device 2 specified by a user on a notify destination setup screen displayed on the display unit 25, as a new TRAP notify destination.

In this case, if the security settings of a communication interface 13 connected to the global IP network 4 do not satisfy a predetermined condition, communication devices 2 that may be set as TRAP notify destinations on the above-described notify destination setup screen are restricted to communication devices 2 connected to the private IP network 3. That is, if general users are allowed to use the image processing apparatus 1 via the global IP network 4, restrictions are imposed so that a communication device 2 connected to the global IP network 4 will not be set as a TRAP notify destination.

If the settings of the system information or the notify destination information are restricted by the restricting unit 170, which will be discussed later, the system information setting unit 113 performs control so that the settings of the system information or the notify destination information will be restricted, as restricted by the restricting unit 170.

[2-4. Confidential Box]

The confidential box 121 stores therein user data associated with one or more specific users and public data which is not associated with any specific users. The user data is data that may be viewed or obtained by only specific users, while the public data is data that may be viewed by general users. The confidential box 121 may be implemented by including the storage unit 12 of the image processing apparatus 1.

[2-5. User-Data/Public-Data Providing Unit]

In response to a request to access user data or public data from a communication device 2, the user-data/public-data providing unit 122 provides the requested user data or public data to the communication device 2. However, if access to user data is restricted by the restricting unit 170, which will be discussed later, the user-data/public-data providing unit 122 performs control so that data to be provided to a communication device 2 will be restricted to only to public data.

[2-6. Processing Data Storage Unit]

The processing data storage unit 131 stores therein data to be processed by the image processing apparatus 1 (for example, print data to be printed by print processing, image data to be generated by scan processing, and image data to be sent by FAX processing). The processing data storage unit 131 may be implemented by including the storage unit 12 of the image processing apparatus 1.

[2-7. Processing Status Notifying Unit]

In response to a request to obtain a processing status from a communication device 2, the processing status notifying unit 132 notifies the communication device 2 of the status of processing executed by the image processing apparatus 1 (more specifically, the processing progress or result or the presence or the absence of an error). In this case, the content of data subjected to this processing is included in the information concerning the processing status. If the notifying of the content of processing data is restricted by the restricting unit 170, which will be discussed later, the processing status notifying unit 132 does not include the content of processing data in the information concerning the processing status.

[2-8. Request Receiving Unit]

The request receiving unit 140 receives a request to send system information from a communication device 2 by using a communication interface 13. The request receiving unit 140 also receives a request to set system information, a request to set notify destination information, a request to access user data, a request to access public data, and a request to send information concerning a processing status.

[2-9. Network Determining Unit]

The network determining unit 150 determines the type of communication network connected to a communication interface 13. In this exemplary embodiment, the network determining unit 150 determines to which one of the private IP network 3 or the global IP network 4 a communication interface 13 which has received a request for system information is connected.

In this exemplary embodiment, in a case in which a global IP address is assigned to a communication interface 13, the network determining unit 150 determines that the communication interface 13 is connected to the global IP network 4. In the other cases, the network determining unit 150 determines that the communication interface 13 is connected to the private IP network 3.

In another example, if the IP address assigned to a communication interface 13 satisfies a predetermined condition (more specifically, if the IP address is within a predetermined range), the network determining unit 150 may determine that the communication interface 13 is connected to the private IP network 3. If this IP address does not satisfy the predetermined condition (if the IP address is outside of the predetermined range), the network determining unit 150 may determine that the communication interface 13 is connected to the global IP network 4.

In another example, the network determining unit 150 may determine the type of communication network connected to a communication interface 13 from the type of network which has been stored in association with the communication interface 13. Alternatively, a connection test concerning the connection with devices connected to the respective communication networks may be conducted, and the network determining unit 150 may determine a communication network that has succeeded in this connection test as a communication network connected to the communication interface 13.

[2-10. Security Setting Judging Unit]

The security setting judging unit 160 judges the setting or the enable/disable of the security settings of a communication interface 13. The security settings include a setting concerning at least one of administrator authenticating data (for example, administrator ID and password) included in a request received by using a communication interface 13, SNMP authenticating data (for example, information concerning a community name and a user), and IP address filtering applied to a communication interface 13. The security setting judging unit 160 judges whether or not the above-described settings are set or whether or not the above-described settings are enabled.

In addition to the above-described settings, the security setting judging unit 160 may judge whether or not proxy settings applied to a communication interface 13 are enabled. If the security settings include a setting concerning at least one of IP address filtering, the security setting judging unit 160 may also judge whether or not the IP address of a communication device 2 will be blocked by the IP address filtering.

[2-11. Restricting Unit]

If the IP address assigned to a communication interface 13 which is used upon receiving a request from a communication device 2 does not satisfy a predetermined condition and if the security settings of the communication interface 13 do not satisfy a predetermined condition, the restricting unit 170 restricts the sending of at least part of the system information to the communication device 2. More specifically, if the network determining unit 150 determines that a communication interface 13 which has received a request is connected to the global IP network 4 and if the security setting judging unit 160 judges that security settings of the communication interface 13 are not set or are disabled, the restricting unit 170 restricts the sending of at least part of the system information.

Some items of system information, the sending of which is restricted by the restricting unit 170, may be management information concerning the image processing apparatus 1 or confidential information handled by the global IP network 4 (such as administrator information). Even if the sending of the above-described items of system information is restricted, it may be allowed to send some items of system information that can be disclosed to general users of the global IP network 4. Conversely, even if the sending of the system information is not restricted by the restricting unit 170, restrictions may be imposed so that confidential information concerning the private IP network 3 will not be sent to communication devices 2 that are connected to the global IP network 4.

The restricting unit 170 also imposes restrictions so that system information and notify destination information stored in the system information storage unit 111 will not be set by a communication device 2 connected to the global IP network 4. More specifically, if it is determined that a communication interface 13 which is used upon receiving a request to set system information or to set notify destination information from a communication device 2 is connected to the global IP network 4 and if it is judged that security settings of the communication interface 13 are not set or are disabled, the restricting unit 170 imposes restrictions so that system information or notify destination information will not be set by the communication device 2.

The restricting unit 170 also restricts access to user data by a communication device 2 connected to the global IP network 4. More specifically, if it is determined that a communication interface 13 which is used upon receiving a request to access user data from a communication device 2 is connected to the global IP network 4 and if it is judged that security settings of the communication interface 13 are not set or are disabled, the restricting unit 170 restricts access by this communication device 2 and allows this communication device 2 to access only public data.

The restricting unit 170 also imposes restrictions so that, when sending information concerning the status of processing performed in the image processing apparatus 1 to a communication device 2 connected to the global IP network 4, the content of data subjected to this processing will not be sent together with this information. More specifically, if it is determined that a communication interface 13 which is used upon receiving a request to send the status of processing from a communication device 2 is connected to the global IP network 4 and if it is judged that security settings of the communication interface 13 are not set or are disabled, the restricting unit 170 imposes restrictions so that the status of processing without the content of processing data (for example, without thumbnail images of a document that has been sent by a fax) will be sent to the communication device 2.

In this exemplary embodiment, the conditions concerning security settings for determining whether or not processing will be restricted by the restricting unit 170 are set in details according to the content of processing.

Figure 3:
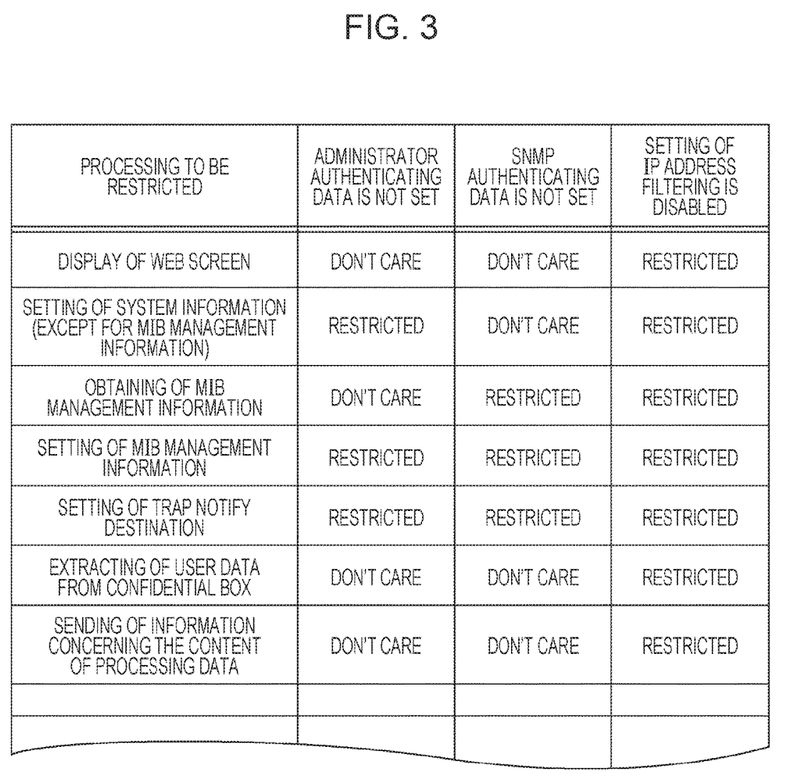
FIG. 3 illustrates a list of security conditions for determining whether or not processing to be executed in an image processing apparatus will be restricted.

FIG. 3 illustrates a list of security conditions for determining whether or not processing executed in the image processing apparatus 1 will be restricted. FIG. 3 shows that, if access is made from a communication device 2 connected to the global IP network 4 and if the security setting judging unit 160 judges that the setting of IP address filtering is disabled, restrictions are imposed so that the display of status of the image processing apparatus 1, extracting of user data from the confidential box 121, or display of a web screen for setting the system information (such as registering of user information in, for example, an address book) will not be performed in this communication device 2. FIG. 3 also shows that, if administrator authenticating data is not set even though IP address filtering is set, restrictions are imposed so that although a web screen may be displayed in the communication device 2, the system information will not be changed on this web screen.

Concerning the obtaining of MIB management information as a response to a SNMP protocol command, if access is made from a communication device 2 connected to the global IP network 4, if SNMP authenticating data in not set, and if the setting of IP address filtering is disabled, restrictions are imposed so that MIB management information is not obtained by this communication device 2. Concerning the setting of MIB management information, if access is made from a communication device 2 connected to the global IP network 4 and if any one of administrator authenticating data, SNMP authenticating data, and IP address filtering is not set, restrictions are imposed so that MIB management information will not be set by the communication device 2.

Concerning the setting of notify destination information indicating a SNMP TRAP notify destination, if access is made from a communication device 2 connected to the global IP network 4 and if any one of administrator authenticating data, SNMP authenticating data, and IP address filtering is not set, restrictions are imposed so that the notify destination information will not be set by the communication device 2. Even in a case in which a communication device 2 is permitted to set notify destination information, if any one of administrator authenticating data, SNMP authenticating data, and IP address filtering is not set in a communication interface 13 connected to the global IP network 4, the restricting unit 170 prohibits a communication device 2 connected to the global IP network 4 to be set as a TRAP notify destination.

Concerning the sending of information concerning the content of processing data (for example, processing for attaching an image of a document which has been sent to a FAX sending report), if access is made from a communication device 2 connected to the global IP network 4 and if the setting of IP address filtering is disabled, restrictions are imposed so that information concerning the content of processing data will not be sent to the communication device 2.

The system information storage unit 111 may store information indicating a list of the security conditions. In this case, the image processing apparatus 1 may have a function of setting the above-described security conditions.

[3. Flow of Processing]

An example of processing executed by the image processing system 10 of this exemplary embodiment will be described below with reference to the sequence diagrams of FIGS. 4 and 8 and the flowcharts of FIGS. 5 through 7.

[3-1. Processing in Response to Request to Send System Information]

[3-1-1. Overall Processing (1)]

Figure 4:
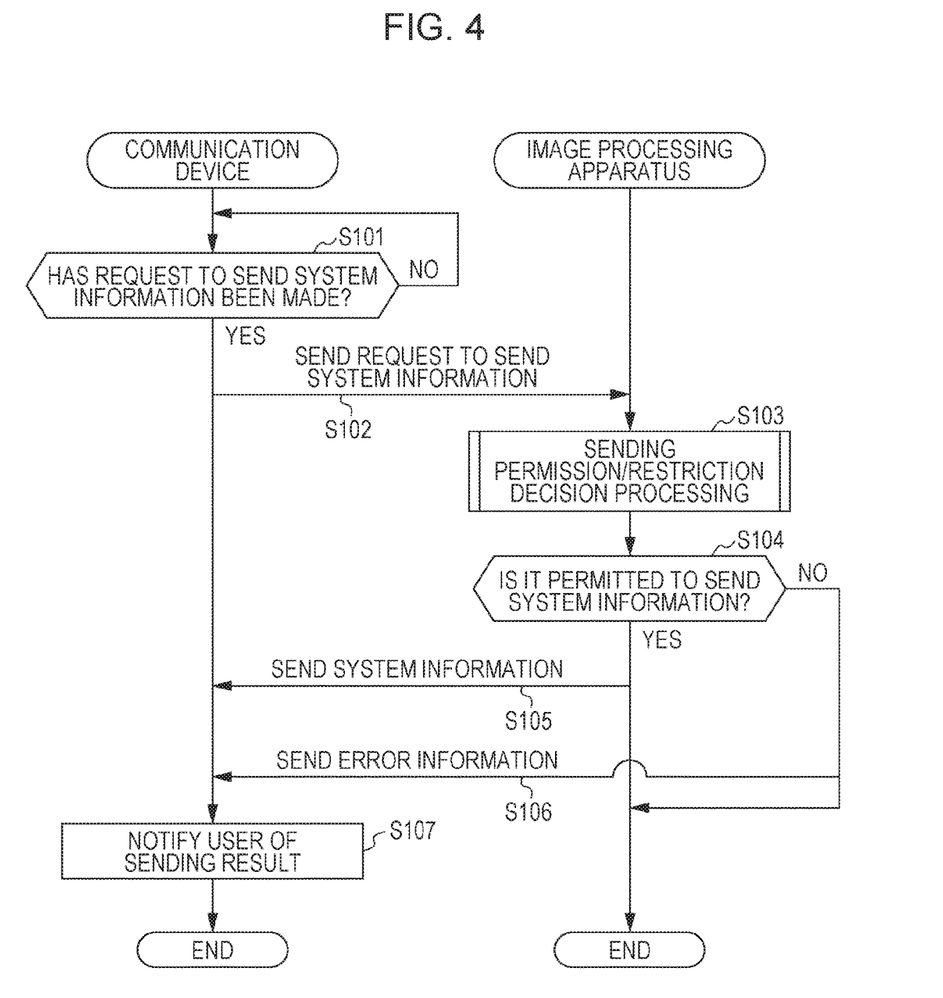
FIG. 4 is a sequence diagram illustrating an example of processing to be executed in response to a request to send system information.

FIG. 4 illustrates an example of processing to be executed in response to a request to send system information stored in the image processing apparatus 1. FIG. 4 is a sequence diagram used both for displaying system information on a web screen and for sending system information by using a SNMP protocol command.

It is first determined in step S101 whether or not a request to send system information has been made in a communication device 2. If the result of step S101 is YES, the process proceeds to step S102. In step S102, the controller 21 of the communication device 2 sends a request to send system information to the image processing apparatus 1 via the communication interface 23.

Upon receiving the request by the communication interface 13 of the image processing apparatus 1, in step S103, the restricting unit 170 of the image processing apparatus 1 executes sending permission/restriction decision processing. Details of the sending permission/restriction decision processing executed in step S103 will be described below with reference to the flowchart of FIG. 5.

[3-1-2. Sending Permission/Restriction Decision Processing (1)]

Figure 5:
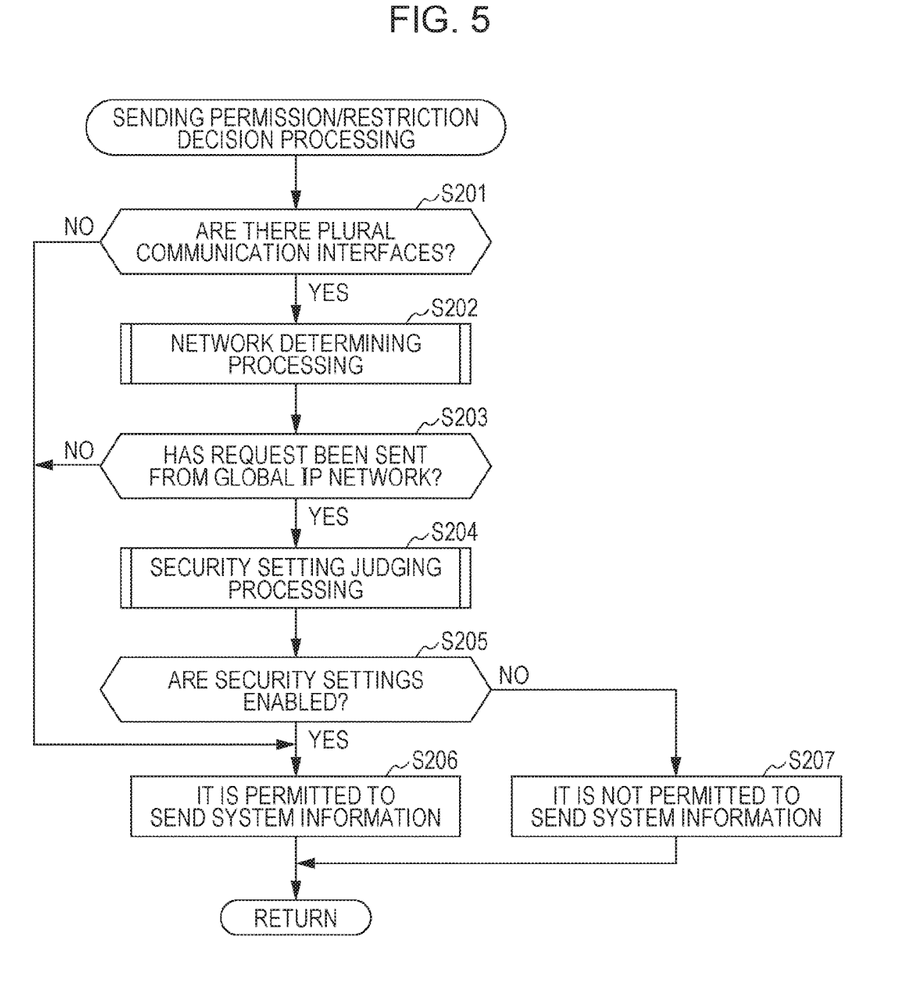
FIG. 5 is a flowchart illustrating an example of sending permission/restriction decision processing.

FIG. 5 is a flowchart illustrating an example of the sending permission/restriction decision processing executed by the image processing apparatus 1. In step S201, the controller 11 of the image processing apparatus 1 determines whether or not the image processing apparatus 1 includes plural communication interfaces 13. If there is only one communication interface 13, the process proceeds to step S206. In step S206, the controller 11 decides that it is permitted to send system information and terminates the sending permission/restriction decision processing. Alternatively, if the result of step S201 is NO, the process may proceed to step S207 in which the controller 11 decides that it is not permitted to send system information.

If it is determined in step S201 that the image processing apparatus 1 includes plural communication interfaces 13, the process proceeds to step S202. In step S202, the network determining unit 150 executes network determination processing. Details of network determining processing executed in step S202 will be described below with reference to the flowchart of FIG. 6.

[3-1-3. Network Determining Processing]

Figure 6:
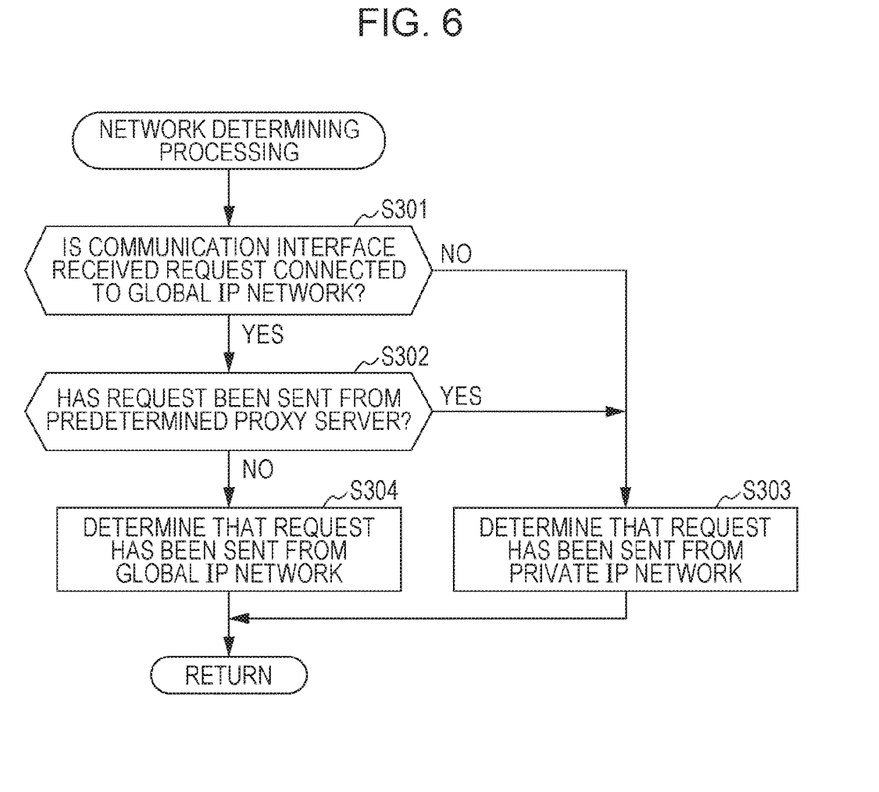
FIG. 6 is a flowchart illustrating an example of network determining processing.

FIG. 6 is a flowchart illustrating an example of network determining processing executed by the image processing apparatus 1. In step S301, the network determining unit 150 of the image processing apparatus 1 determines whether or not the type of communication network connected to a communication interface 13 which has received a request is the global IP network 4. If it is determined in step S301 that the type of communication network connected to the communication interface 13 is the private IP network 3, that is, if the result of step S301 is NO, the process proceeds to step S303. In step S303, the controller 11 of the image processing apparatus 1 determines that the request to send system information has been sent from the private IP network 3 and terminates the network determining processing.

If it is determined in step S301 that the type of communication network connected to the communication interface 13 is the global IP network 4, that is, if the result of step S301 is YES, the process proceeds to step S302. In step S302, the controller 11 determines whether or not the request to send system information has been sent from a predetermined proxy server. If the result of step S302 is YES, the process proceeds to step S303. In step S303, the controller 11 determines that the request has been sent from the private IP network 3. If it is determined in step S302 that the request has been sent from a server other than the predetermined proxy server, the process proceeds to step S304. In step S304, the controller 11 determines that the request has been sent from the global IP network 4. The controller 11 then terminates the network determining processing. If the IP address of the sender device coincides with the IP address of the proxy server, the controller 11 may determine in step S302 that the request to send system information has been sent from the predetermined proxy server. Step S302 may be omitted.

[3-1-4. Sending Permission/Restriction Decision Processing (2)]

Referring back to FIG. 5, if it is determined in step S203 as a result of the network determining processing in step S202 that the request has been sent from the private IP network 3, that is, if the result of step S203 is NO, the process proceeds to step S206. In step S206, the restricting unit 170 decides that it is permitted to send system information, and terminates the sending permission/restriction decision processing.

If it is determined in step S203 that the request has been sent from the global IP network 4, the process proceeds to step S204. In step S204, the security setting judging unit 160 executes security setting judging processing. Details of the security setting judging processing executed in step S204 will be described below with reference to FIG. 7.

[3-1-5. Security Setting Judging Processing]

The security setting judging unit 160 first refers to a list of security conditions, such as that shown in FIG. 3, and judges the setting or the enable/disable of the security settings in accordance with the processing to be executed. If the sending of system information through the use of a web screen (webpage data) is requested, the security setting judging unit 160 judges whether or not the setting of IP address filtering is enabled. If the sending of system information by using the SNMP protocol is requested, the security setting judging unit 160 judges whether or not SNMP authenticating data is set, in addition to judging whether or not the setting of IP address filtering is enabled.

Figure 7:
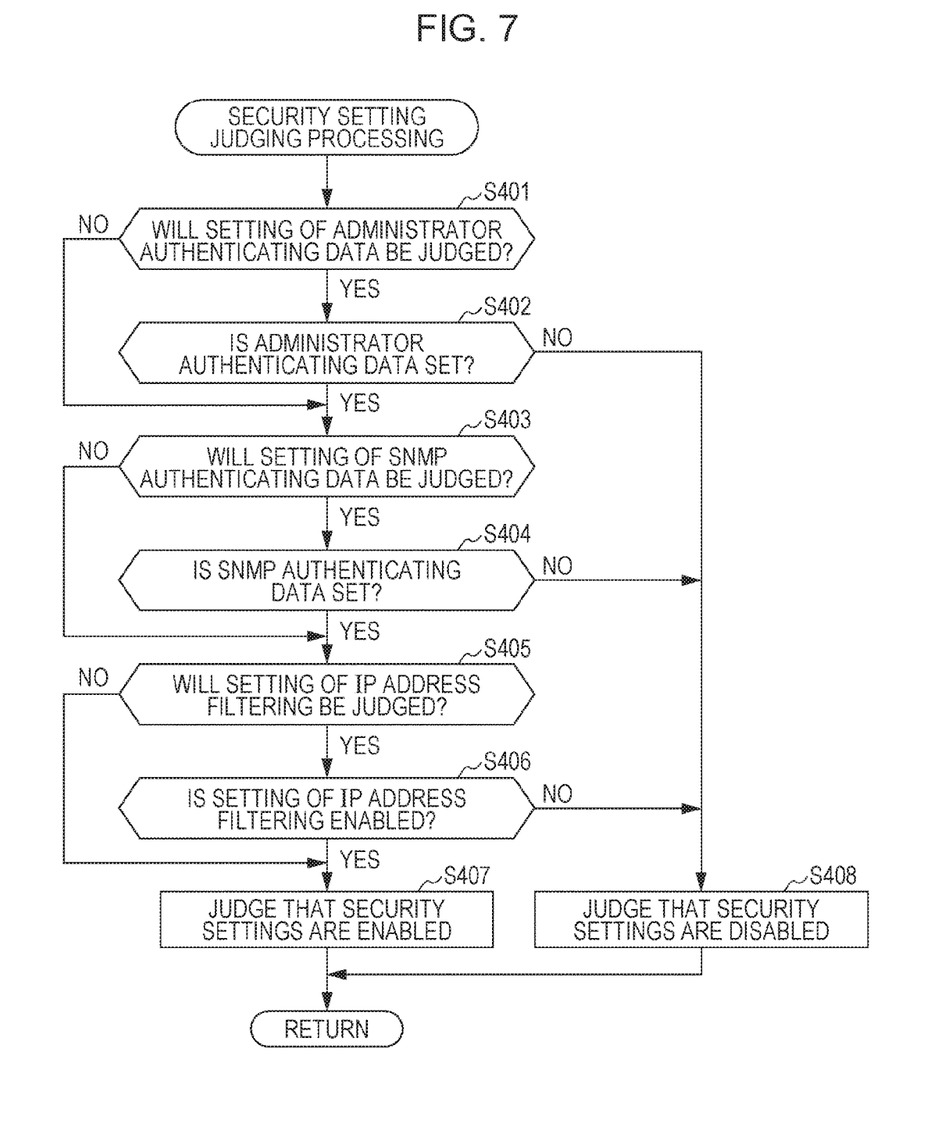
FIG. 7 is a flowchart illustrating an example of security setting judging processing.

FIG. 7 is a flowchart illustrating an example of the security setting judging processing executed by the image processing apparatus 1. In step S401, the security setting judging unit 160 determines whether to judge the setting of administrator authenticating data. If the result of step S401 is YES, the process proceeds to step S402. In step S402, the security setting judging unit 160 determines whether or not the administrator authenticating data is set. If the result of step S402 is NO, the process proceeds to step S408. In step S408, the security setting judging unit 160 judges that the security settings are disabled. If the administrator ID and password included in the request to send system information do not coincide with those which have been registered, the security setting judging unit 160 may judge that the security settings are disabled.

In step S403, the security setting judging unit 160 determines whether to judge the setting of SNMP authenticating data. If the result of step S403 is YES, the process proceeds to step S404. In step S404, the security setting judging unit 160 determines whether or not the SNMP authenticating data is set. If the result of step S404 is NO, the process proceeds to step S408. In step S408, the security setting judging unit 160 judges that the security settings are disabled. If the SNMP authenticating data included in the request to send system information does not coincide with that which has been registered, the security setting judging unit 160 may judge that the security settings are disabled.

In step S405, the security setting judging unit 160 determines whether to judge the setting of IP address filtering. If the result of step S405 is YES, the process proceeds to step S406. In step S406, the security setting judging unit 160 determines whether or not the setting of IP address filtering is enabled. If the result of step S406 is NO, the process proceeds to step S408. In step S408, the security setting judging unit 160 judges that the security settings are disabled. The security setting judging unit 160 may also determine whether or not the IP address of the communication device 2 which has sent the request coincides with a predetermined IP address.

If all the conditions for the security settings are satisfied, the security setting judging unit 160 judges in step S407 that the security settings are enabled, and terminates the security setting judging processing. For example, in response to a request to obtain MIB management information, if SNMP authenticating data is not set or if the setting of IP address filtering is not enabled, the security setting judging unit 160 judges that the security settings are disabled.

[3-1-6. Sending Permission/Restriction Decision Processing (3)]

Referring back to FIG. 5, if it is determined in step S205 as a result of the security setting judging processing in step S204 that the security settings are enabled, the process proceeds to step S206. In step S206, the restricting unit 170 of the image processing apparatus 1 decides that it is permitted to send system information. If it is determined in step S205 that the security settings are disabled, the process proceeds to step S207. In step S207, the restricting unit 170 decides that it is not permitted to send system information. The restricting unit 170 then terminates the sending permission/restriction decision processing.

It is now assumed that a request to send system information has been sent from a communication device 2 connected to the global IP network 4. In this case, as long as the requested system information concerns a communication interface 13 connected to the global IP network 4 (for example, information concerning the network administrator of the global IP address), even if some of the security settings do not satisfy a predetermined condition, the restricting unit 170 may decide, as an exceptional case, that it is permitted to send system information in step S206. In other words, if the IP address assigned to a communication interface 13 used upon receiving a request is a global IP address and if the security settings of the communication interface 13 do not satisfy a predetermined condition, the restricting unit 170 may impose restrictions so that at least part of system information, which is system information concerning another communication interface 13 different from the above-described communication interface 13 (more specifically, system information concerning a communication interface 13 to which a private IP address is assigned, or system information used for plural communication interfaces 13, such as the password of a device administrator and information concerning a document stored in the confidential box 121) will not be sent.

In another example, if a request to send system information is sent from a communication device 2 connected to the global IP network 4 and if the security settings of a communication interface 13 to which a global IP address is assigned are determined to be enabled, the restricting unit 170 may permit the sending of system information as long as this system information concerns a communication interface 13 to which a global IP address is assigned. In this case, the restricting unit 170 may still restrict the sending of system information concerning a communication interface 13 to which a private IP address is assigned (for example, system information used for plural communication interfaces 13, such as the password of a device administrator and information concerning a document stored in the confidential box 121).

[3-1-7. Overall Processing (2)]

Referring back to FIG. 4, if it is determined in step S104 as a result of the sending permission/restriction decision processing in step S103 that it is permitted to send system information, the process proceeds to step S105. In step S105, the system information sender 112 sends the requested system information to the communication device 2. The processing is then terminated. If it is determined in step S104 that it is not permitted to send system information, the process proceeds to step S106. In step S106, the system information sender 112 sends error information, which indicates that the sending of system information is restricted, to the communication device 2. The processing is then terminated. If it is determined that it is not permitted to send system information in response to a request from the global IP, for security reasons, the type of information to be displayed on the display unit 25 of the communication device 2 may be restricted, such as error information or information for specifying the device is not displayed.

In step S107, the controller 21 of the communication device 2 notifies a user of a sending result indicating whether or not system information has been sent, and terminates the processing. The controller 21 notifies the user of the sending result of the system information by displaying, on the display unit 25 of the communication device 2, a display screen showing, for example, a message indicating whether or not the system information has been successfully received, the content of the system information, or the content of error information.

[3-2. Processing in Response to Request to Set System Information]

Figure 8:
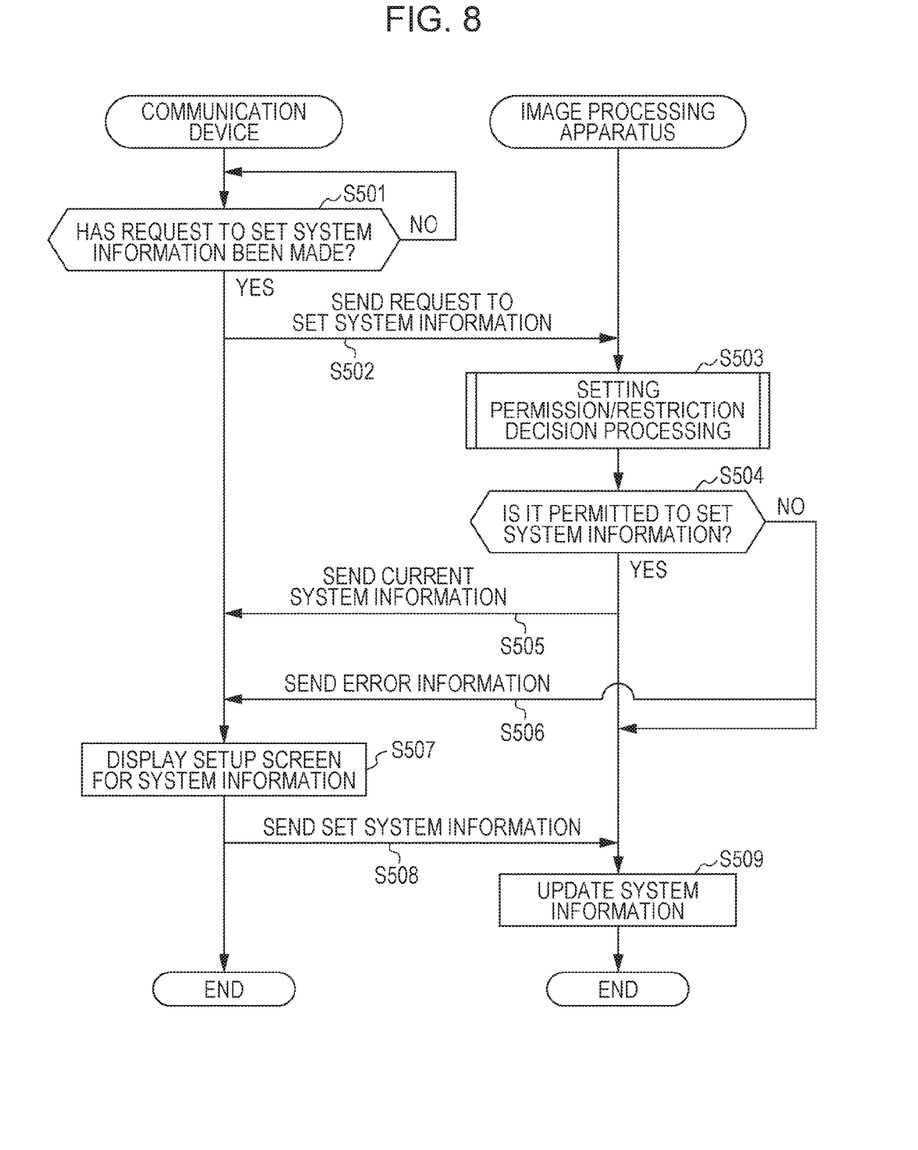
FIG. 8 is a sequence diagram illustrating an example of processing to be executed in response to a request to set system information.

FIG. 8 illustrates an example of processing to be executed in response to a request to set system information stored in the image processing apparatus 1. Examples of system information to be set are an administrator password or a password for accessing the confidential box 121. It is first determined in step S501 whether or not a request to set system information has been made in a communication device 2. If the result of step S501 is YES, the process proceeds to step S502. In step S502, the communication device 2 sends a request to set system information to the image processing apparatus 1 via the communication interface 23.

Upon receiving the request by the image processing apparatus 1, in step S503, the restricting unit 170 of the image processing apparatus 1 executes setting permission/restriction decision processing. The setting permission/restriction decision processing in step S503 is substantially the same as the sending permission/restriction decision processing in step S103 of FIG. 5 if "sending" is replaced by "setting", and thus, an explanation thereof will be omitted.

If it is determined in step S504 as a result of the setting permission/restriction decision processing in step S503 that it is permitted to set system information, the process proceeds to step S505. In step S505, the system information sender 112 sends current system information that can be set by the communication device 2 to the communication device 2. If it is determined in step S504 that it is not permitted to set system information, the process proceeds to step S506. In step S506, the system information sender 112 sends error information, which indicates that the setting of system information is restricted, to the communication device 2.

In step S507, the controller 21 of the communication device 2 displays a setup screen for setting system information stored in the image processing apparatus 1 on the display unit 25 of the communication device 2. If the setting of the system information is restricted by the restricting unit 170 of the image processing apparatus 1, the controller 21 may display a message indicating the content of error information instead of the setup screen. If the setting of some items of the system information is restricted, the controller 21 may not display these items of the system information or may display a display screen indicating that the operation will be disabled.

When the system information displayed on the setup screen is set by the user, in step S508, the controller 21 of the communication device 2 sends the set system information to the image processing apparatus 1. Then, in step S509, the system information setting unit 113 of the image processing apparatus 1 updates the system information stored in the system information storage unit 111 to the system information sent in step S508.

[3-3. Processing in Response to Request to Set Notify Destination Information]

Processing to be executed in response to a request to set notify destination information indicating a communication device 2 as a TRAP notify destination is substantially the same as the above-described processing to be executed in response to a request to set system information if "system information" is replaced by "notify destination information". In this processing, if a request to set notify destination information is sent from a communication device 2 connected to the global IP network 4, the communication device 2 is permitted to set notify destination information as long as administrator authenticating data, SNMP authenticating data, and IP address filtering are all set. However, if security settings of a communication interface 13 connected to the global IP network 4 do not satisfy a predetermined condition (for example, if any one of administrator authenticating data, SNMP authenticating data, and IP address filtering is not set or setting thereof is disabled), restrictions are imposed so that a communication device 2 connected to this IP global network 4 will not be set as a notify destination, such as a TRAP notify destination.

[3-4. Processing in Response to Request to Extract Data From Confidential Box]

Figure 9:
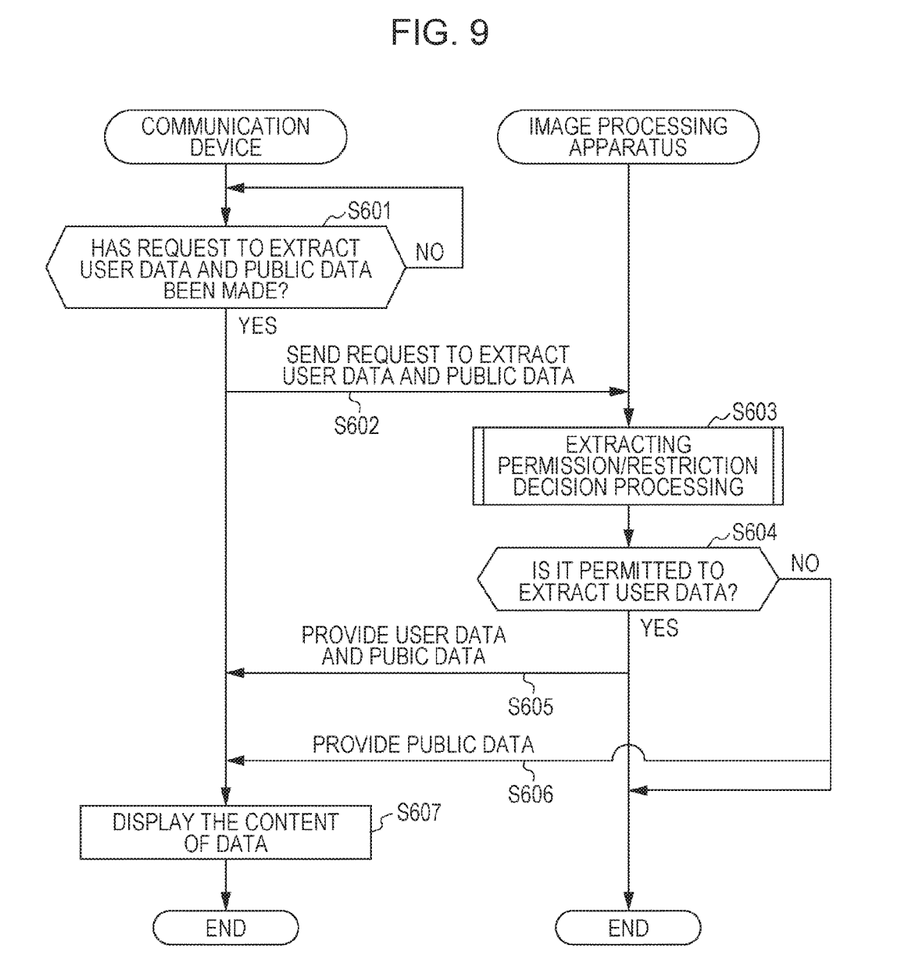
FIG. 9 is a sequence diagram illustrating an example of processing to be executed in response to a request to extract user data and public data.

FIG. 9 illustrates an example of processing to be executed in response to a request to extract user data and public data from the confidential box 121 of the image processing apparatus 1. It is first determined in step S601 whether or not a request to extract user data and public data has been made in a communication device 2. If the result of step S601 is YES, the process proceeds to step S602. In step S602, the communication device 2 sends a request to extract user data and public data to the image processing apparatus 1 via the communication interface 23. Upon receiving the request by the image processing apparatus 1, in step S603, the restricting unit 170 of the image processing apparatus 1 executes extracting permission/restriction decision processing. The extracting permission/restriction decision processing in step S603 is substantially the same as the sending permission/restriction decision processing in step S103 of FIG. 5 if "permitted to send system information" and "not permitted to send system information" are replaced by "permitted to extract user data" and "not permitted to extract user data", respectively, and an explanation thereof will thus be omitted.

If it is determined in step S604 as a result of the extracting permission/restriction decision processing in step S603 that it is permitted to extract user data, the process proceeds to step S605. In step S605, the system information sender 112 sends both of user data and public data to the communication device 2. If it is determined in step S604 that it is not permitted to extract user data, the process proceeds to step S606. In step S606, the system information sender 112 sends only public data to the communication device 2. Then, in step S607, the content of provided data is displayed on the display unit 25 of the communication device 2.

[3-5. Processing in Response to Request to Send Information Concerning Processing Status]

Figure 10:
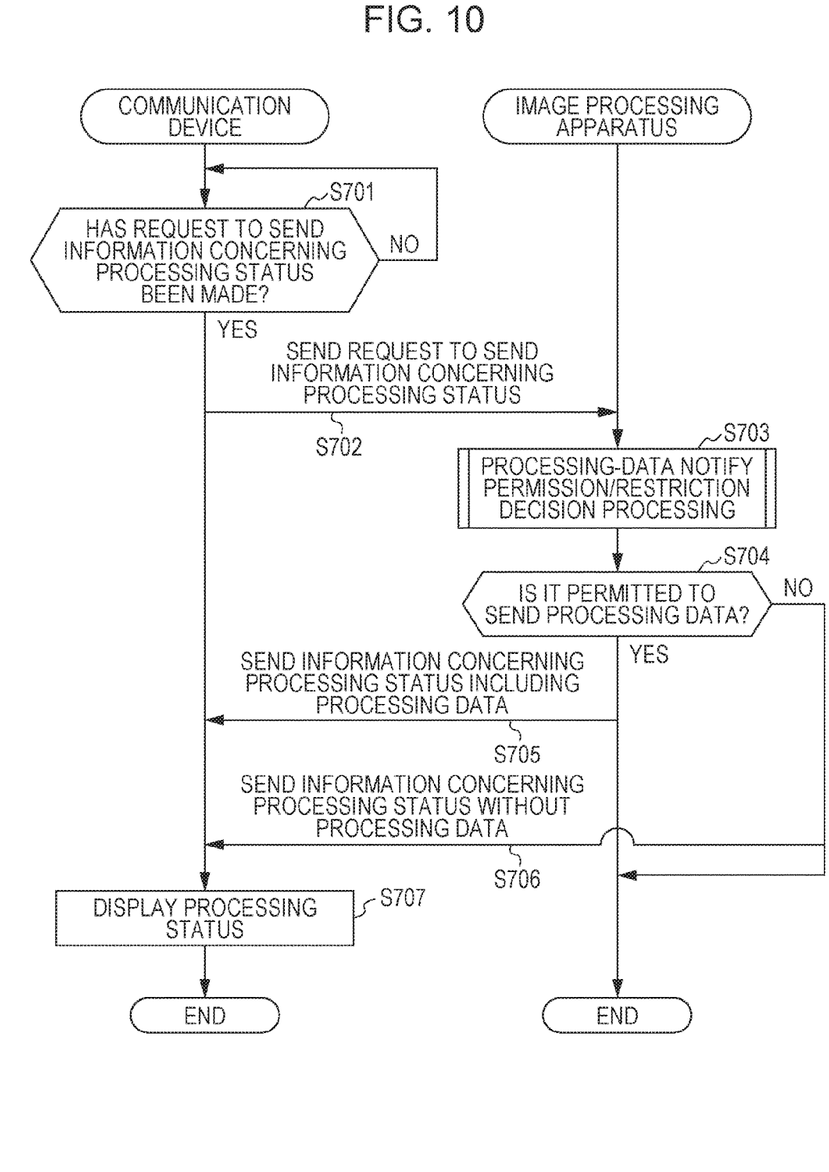
FIG. 10 is a sequence diagram illustrating an example of processing to be executed in response to a request to send information concerning the status of processing.

FIG. 10 illustrates an example of processing to be executed in response to a request to send information concerning the status of processing executed in the image processing apparatus 1. It is first determined in step S701 whether or not a request to send information concerning the status of processing executed in the image processing apparatus 1 has been made in a communication device 2. If the result of step S701 is YES, the process proceeds to step S702. In step S702, the communication device 2 sends a request to send information concerning the status of processing executed in the image processing apparatus 1 to the image processing apparatus 1 via the communication interface 23. Upon receiving the request by the image processing apparatus 1, in step S703, the restricting unit 170 of the image processing apparatus 1 executes processing-data notify permission/restriction decision processing. The processing-data notify permission/restriction decision processing in step S703 is substantially the same as the sending permission/restriction decision processing in step S103 of FIG. 5 if "permitted to send system information" and "not permitted to send system information" are replaced by "permitted to notify a communication device 2 of processing data" and "not permitted to notify a communication device 2 of processing data", respectively, and an explanation thereof will thus be omitted.

If it is determined in step S704 as a result of the processing-data notify permission/restriction decision processing in step S703 that it is permitted to notify the communication device 2 of processing data, the process proceeds to step S705. In step S705, the processing status notifying unit 132 notifies the communication device 2 of the processing status including the processing data. If it is determined in step S704 that it is not permitted to notify the communication device 2 of processing data, the process proceeds to step S706. In step S706, the processing status notifying unit 132 notifies the communication device 2 of the processing status without the processing data. Then, in step S707, the processing status is displayed on the display unit 25 of the communication device 2, and if the processing data is included in the processing status, an image indicating the content of the processing data is also displayed.

In this manner, when a request to send or set system information is made from the global IP network 4, which is a non-secure communication network, the image processing apparatus 1 restricts the sending or the setting of system information, thereby preventing a leakage of system information.

The present invention is not restricted to the above-described exemplary embodiment. In the above-described exemplary embodiment, when a communication interface 13 which has received a request is connected to the private IP network 3, processing in response to the request is executed without the judging unit 170 judging security settings. However, even if a communication interface 13 which has received a request is connected to the private IP network 3, the restricting unit 170 may restrict the execution of processing in response to the request in accordance with a judging result of the security settings.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
one or more communication interfaces; and
a processor configured to execute:
a request receiving unit configured to receive, by using a communication interface, among the one or more communication interfaces, a request for system information, including user data associated with at least one user of the image processing apparatus and public data unassociated with the at least one user, concerning the image processing apparatus from a communication device;
a determination unit configured to determine whether the communication interface is connected to a global IP address or a private IP address; and
a restricting unit configured to restrict access to the user data and send the public data to the communication device in response to the determination unit determining that the communication interface is connected to the global IP address,
wherein, in a case that the request is received by using the communication interface connected to the global IP address and refers to an image processing job, the sent public data includes a status of the image processing job without including content of the image processing job,
wherein, the restricting unit is further configured to allow access to the user data in response to the determination unit determining that the communication interface is connected to the private IP address, and
wherein, in a case that the request is received by using the communication interface connected to the private IP address and refers to the image processing job, the sent public data includes a status of the image processing job and the content of the image processing job.

2. The image processing apparatus according to claim 1, wherein the restricting unit is further configured to, if a security setting of the communication interface does not satisfy a predetermined condition, restrict at least part of the system information to be sent to the communication device.

3. The image processing apparatus according to claim 2, wherein the restricting unit is further configured to, if the determination unit determines that the communication interface is connected to the global IP address and if the security setting of the communication interface does not satisfy a predetermined condition, restrict, among at least part of the system information to be sent to the communication device, information concerning another communication interface different from the communication interface used for receiving the request.

4. The image processing apparatus according to claim 2, wherein the security setting includes a setting concerning at least one of administrator authenticating data, SNMP authenticating data, and IP address filtering.

5. The image processing apparatus according to claim 1, wherein the processor is further configured to execute:
a notify destination setting unit configured to set the communication device as a notify destination, which will be notified of at least part of the system information upon an occurrence of a predetermined event,
wherein the restricting unit is further configured to, if a security setting of a communication interface connected to a global IP network does not satisfy a predetermined condition, prohibit a communication device connected to the global IP network to be set as the notify destination.

6. The image processing apparatus according to claim 1, further comprising:
a data storage that stores the user data associated with the at least one user which has been set in advance and the public data unassociated with any of the at least one user, wherein the restricting unit is further configured to, if the determination unit determines that the communication interface is connected to the global IP address and if a security setting of the communication interface does not satisfy a predetermined condition, restrict access from the communication device only to the public data.

7. The image processing apparatus according to claim 1, wherein the determination unit is further configured to determine whether the request requests information concerning one of the communication interfaces connecting the image processing apparatus to the global IP address, and
the restricting unit is further configured, in a case that the request requests the information concerning one of the communication interfaces connecting the image processing apparatus to the global IP address and a predetermined security setting of the image processing apparatus is not satisfied with respect to the request, to send the system information requested by the request.

8. The image processing apparatus according to claim 1, wherein the determination unit is further configured to determine whether the communication interface which receives the request also connects the image processing apparatus to the global IP address,
wherein the determination unit is further configured, in a case that the communication interface which receives the request is determined by the determination unit to connect the image processing apparatus to the global IP address, to determine whether the request is also sent from a predetermined proxy server to the image processing apparatus, and
wherein the restriction unit is further configured, in a case that the request is determined by the determination unit to also be sent from the predetermined proxy server, to provide the access to the user data and the public data without restriction.

9. The image processing apparatus according to claim 1, wherein the restricting unit is further configured to, in response to determining both that the request is made by a communication device connected to the global IP address and that a setting of IP address filtering is disabled, restrict access to the user data and send the public data.

10. A method in an image processing apparatus comprising:
receiving, by using a communication interface, a request for system information, user data associated with at least one user of the image processing apparatus and public data unassociated with the at least one user, concerning the image processing apparatus from a communication device;
determining whether the communication interface is connected to a global IP address or a private IP address;
restricting, in response to the determining that the communication interface is connected to the global IP address, at least part of the system information by sending the public data to the communication device and refraining from sending the user data to the communication device; and in a case that requested public data is received by the communication interface connected to the global IP address and refers to an image processing job, the public data sent includes a status of the image processing job without including a content of the image processing job, wherein access to the user data is allowed in response to the determination unit determining that the communication interface is connected to the private IP address, and wherein, in a case that the request is received by using the communication interface connected to the private IP address and refers to the image processing job, the sent public data includes a status of the image processing job and the content of the image processing job.

11. A non-transitory computer readable medium storing a program causing a computer to execute a process in an image processing apparatus, the process comprising:

receiving, by using a communication interface, a request for system information, user data associated with at least one user of the image processing apparatus and public data unassociated with the at least one user, concerning the image processing apparatus from a communication device;

determining whether the communication interface is connected to a global IP address or a private IP address; and restricting, in response to the determining that the communication interface is connected to the global IP address, at least part of the system information by sending the public data to the communication device and refraining from sending the user data to the communication device and in a case that requested public data is received by the communication interface connected to the global IP address and refers to an image processing job, the public data sent includes a status of the image processing job without including a content of the image processing job, wherein access to the user data is allowed in response to the determination unit determining that the communication interface is connected to the private IP address, and wherein, in a case that the request is received by using the communication interface connected to the private IP address and refers to the image processing job, the sent public data includes a status of the image processing job and the content of the image processing job.

* * * * *